Jan. 16, 1934.  R. E. ORMSBY ET AL  1,943,693
HOUSED GEARING
Original Filed Nov. 19, 1931
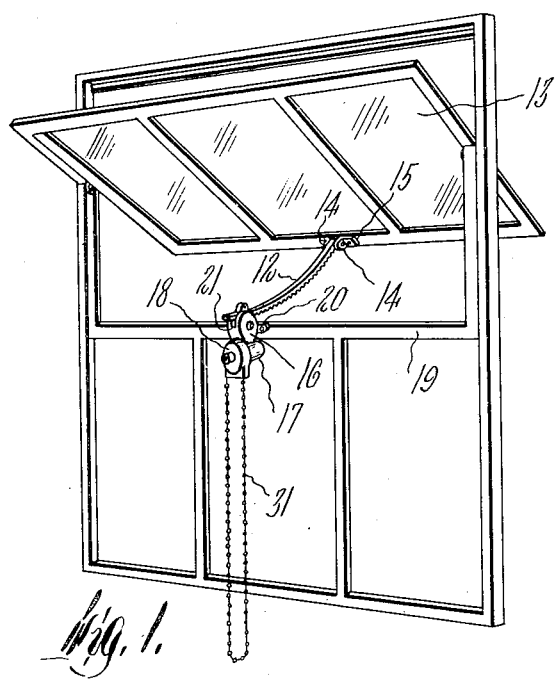
Fig. 1.
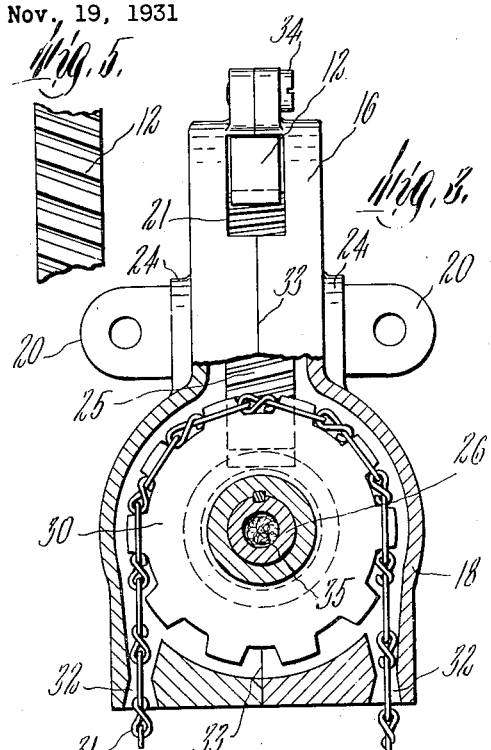
Fig. 5.
Fig. 3.
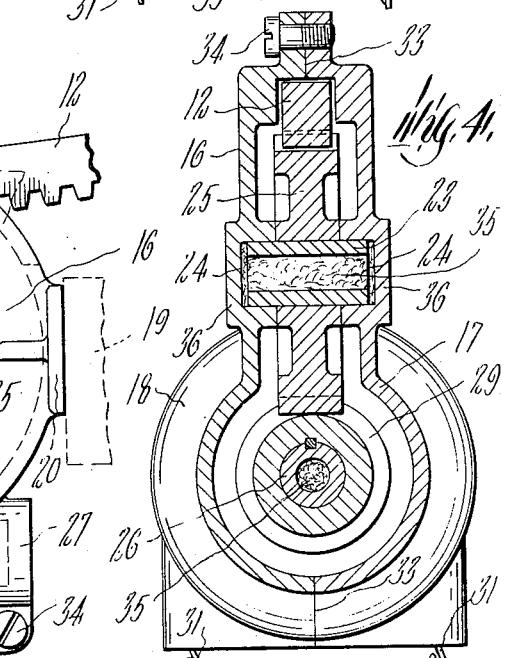
Fig. 4.
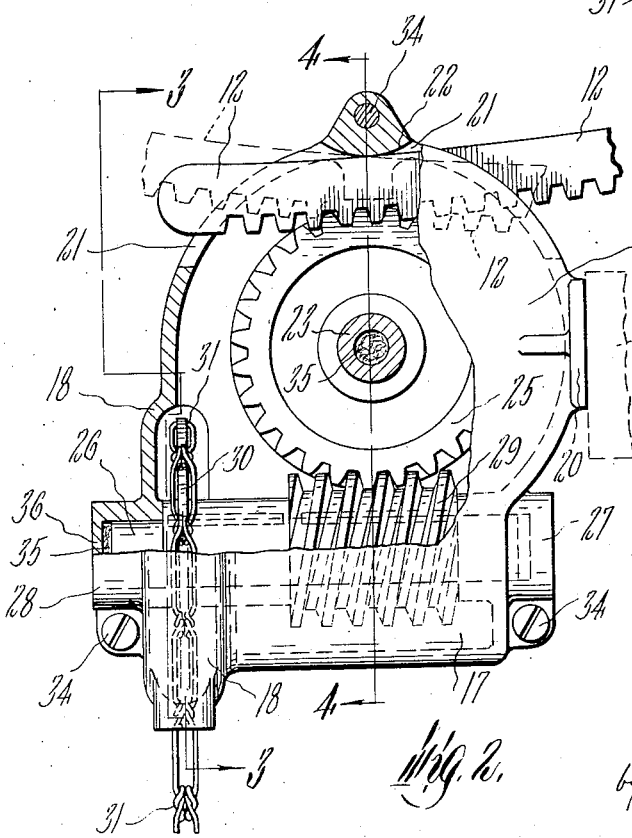
Fig. 2.
Inventors
Roy E. Ormsby
Leslie E. Ormsby
by Wright Brown Quinby Many
Attys.

Patented Jan. 16, 1934

1,943,693

UNITED STATES PATENT OFFICE 1,943,693

HOUSED GEARING

Roy E. Ormsby, Wakefield, and Leslie E. Ormsby, Watertown, Mass.

Application November 19, 1931, Serial No. 576,028. Renewed June 9, 1933

4 Claims. (Cl. 74—27)

This invention relates to improvements in housed gearing, and particularly to gearing for opening and closing a horizontally pivoted sash, said gearing being operable from a floor below the elevated sash.

The object of the invention is to provide housed gearing of simple, strong and durable construction, adapted to be easily manipulated, and to prevent accidental movement of a movable member operated by the gearing from any position to which it may be adjusted.

Of the accompanying drawing forming a part of this specification,—

Figure 1 shows in perspective a sash operator embodying the invention associated with supporting means and with a horizontally pivoted or hinged sash.

Figure 2 shows the operator in side elevation and partly in section, only a portion of the rack bar being shown.

Figure 3 is a section on line 3—3 of Figure 2 looking toward the right.

Figure 4 is a section on line 4—4 of Figure 2 looking toward the left.

Figure 5 is a fragmentary side view showing a portion of the rack bar.

The same reference characters indicate the same parts in all of the figures.

In the drawing 12 designates a rack bar having means at one end for pivotal connection with a horizontally pivoted sash 13, said means comprising, in this instance, ears 14 fixed to the sash and a pivot stud 15 connecting one end of the rack bar with the ears.

The operator includes a fixed housing comprising a gear chamber 16, a worm chamber 17 and a pulley chamber 18. The housing is provided with means for attachment as a unit to a fixed support 19, said means preferably including lugs 20 projecting in opposite directions from the gear chamber 16, and adapted to be secured to the support 19, each of said lugs being shown by Figure 3.

The gear chamber is provided with a guiding passage in its upper portion permitting longitudinal movements and various angular positions of the rack bar, one of said positions being shown by full lines and another by dotted lines in Figure 2. Said passage is defined in part by slots 21 in opposite sides of the gear chamber wall and in part by a fixed member 22a located between the slots 21 and having a salient face 22 bearing on the back of the rack bar.

25 designates a gear whose teeth mesh with the teeth of the rack bar, the gear being preferably helical and its teeth conjugate to those of the rack. The gear 25 is fixed to a short shaft 23 whose opposite ends constitute journals rotatable in bearings 24 in opposite walls of the gear chamber, the housing being therefore provided with a pair of bearings 24 as shown by Fig. 4.

26 designates a worm shaft extending through the worm and pulley chambers and journalled in a bearing 27 at one end of the worm chamber, and a bearing 28 at one side of the pulley chamber. The housing is therefore provided with another pair of bearings as shown by Fig. 2. To said shaft is fixed a worm 29 located within the worm chamber and meshing with the gear 25.

30 designates a pulley, preferably a sprocket wheel, fixed to the worm shaft and located in the pulley chamber. A flexible pull member 31, preferably an endless chain, is engaged with the pulley and depends therefrom through guides 32 below the pulley chamber.

The housing is made in two sections having edges meeting on the line 33, (Figs. 3 and 4), the sections being duplicates of each other and provided with means whereby they are separably connected to permit the convenient separation and assemblage of the parts of the operator. The connecting means here shown includes screws 34 inserted in ears formed on the meeting portions of the sections, three screws being shown by Figure 2.

The gear shaft 23 and worm shaft 26 are preferably tubular. Wicks 35 saturated with a lubricant are inserted in the bores of said shafts and lubricate the bearings thereof. The outer ends of said bearings are preferably closed by end caps 36 from which the ends of the shafts 23 and 26 are spaced to allow oil from the wicks to properly lubricate the bearings.

It will be seen that the helical gear and rack are adapted to prevent accidental endwise movement of the rack and rotation of the gear by pressure exerted by the sash 13 on the rack, so that the sash is caused to remain in any position to which it may be adjusted.

The member 19 constitutes a fixed supporting element of a building structure, and the sash 13 constitutes a swinging element of said structure.

Although we have shown the rack bar 12 connected with the swinging element and the housing with the fixed element, the arrangement may be reversed, the rack being connected with the fixed element and the housing with the swinging element.

We claim:

1. In combination, a housing attachable as a unit to a support, said housing including attaching means, a gear chamber, a worm chamber, a pulley chamber, and bearings associated with said chambers and arranged in pairs, a rack bar longitudinally movable in the gear chamber, a gear meshing with the rack bar teeth and having journals rotatable in the bearings of one pair, a worm shaft rotatable in the bearings of another pair and extending through the worm and pulley chambers, a worm fixed to the worm shaft within the worm chamber and meshing with the gear, and a worm-rotating pulley fixed to the worm shaft within the worm chamber.

2. In combination, a housing attachable as a unit to a support, said housing including attaching means, a gear chamber, a worm chamber, a pulley chamber, and bearings associated with said chambers and arranged in pairs, a rack bar longitudinally movable in the gear chamber and having helical teeth, a helical gear in the gear chamber having journals rotatable in the bearings of one pair, the gear teeth being conjugate to the rack bar teeth and meshing therewith, a worm shaft rotatable in the bearings of another pair and extending through the worm and pulley chambers, a worm fixed to the worm shaft within the worm chamber and meshing with the helical gear, and a worm-rotating pulley fixed to the worm shaft within the worm chamber.

3. In combination, a housing attachable as a unit to a support, said housing including attaching means, a gear chamber, a worm chamber, a pulley chamber, and bearings associated with said chambers and arranged in pairs, a rack bar longitudinally movable in the gear chamber, a gear meshing with the rack bar teeth and having journals rotatable in the bearings of one pair, a worm shaft rotatable in the bearings of another pair and extending through the worm and pulley chambers, a worm fixed to the worm shaft within the worm chamber and meshing with the gear, and a worm-rotating pulley fixed to the worm shaft within the worm chamber, the gear chamber being provided with a rack bar-guiding passage defined in part by slots in opposite sides of the gear chamber wall, and in part by a fixed member located between said slots, and having a salient face bearing on the back of the rack bar to confine said bar in engagement with the gear and permit various angular positions of the rack bar.

4. In combination, a housing attachable as a unit to a support, said housing including attaching means, a gear chamber, a worm chamber, a pulley chamber, and bearings associated with said chambers and arranged in pairs, a rack bar longitudinally movable in the gear chamber, a gear meshing with the rack bar teeth and having journals rotatable in the bearings of one pair, a worm shaft rotatable in the bearings of another pair and extending through the worm and pulley chambers, a worm fixed to the worm shaft within the worm chamber and meshing with the gear, and a worm-rotating pulley fixed to the worm shaft within the worm chamber, said housing being composed of two sections having meeting edges, and provided with means whereby said sections are separably connected, each section being a duplicate of the other and constituting one half of the housing.

ROY E. ORMSBY.
LESLIE E. ORMSBY.